United States Patent
Matsuki et al.

(10) Patent No.: US 9,768,687 B2
(45) Date of Patent: Sep. 19, 2017

(54) STEP-DOWN DC/DC CONVERTER

(71) Applicant: ROHM CO., LTD., Ukyo-Ku, Kyoto (JP)

(72) Inventors: Takeru Matsuki, Kyoto (JP); Koichi Miyanaga, Kyoto (JP)

(73) Assignee: ROHM CO., LTD., Kyoto (JP)

( * ) Notice: Subject to any disclaimer, the term of this patent is extended or adjusted under 35 U.S.C. 154(b) by 0 days.

(21) Appl. No.: 15/334,642

(22) Filed: Oct. 26, 2016

(65) Prior Publication Data

US 2017/0117803 A1    Apr. 27, 2017

(30) Foreign Application Priority Data

Oct. 26, 2015  (JP) ................. 2015-209956

(51) Int. Cl.
*H02M 3/156*   (2006.01)

(52) U.S. Cl.
CPC ................... *H02M 3/156* (2013.01)

(58) Field of Classification Search
CPC .................................... H02M 3/156
See application file for complete search history.

(56) References Cited

U.S. PATENT DOCUMENTS

| | | | | |
|---|---|---|---|---|
| 2011/0133711 A1* | 6/2011 | Murakami | ......... | H03K 17/0822 323/282 |
| 2012/0187934 A1* | 7/2012 | Suzuki | ................. | H02M 3/158 323/311 |
| 2014/0159687 A1* | 6/2014 | Lee | ...................... | H02M 3/1588 323/282 |
| 2014/0217959 A1* | 8/2014 | Chen | ...................... | H02J 7/0052 320/107 |
| 2017/0033677 A1* | 2/2017 | Wu | ......................... | H02M 1/08 |

FOREIGN PATENT DOCUMENTS

JP    2011014738 A    1/2011

* cited by examiner

*Primary Examiner* — Adolf Berhane
*Assistant Examiner* — Bart Iliya
(74) *Attorney, Agent, or Firm* — Cantor Colburn LLP

(57) ABSTRACT

A bootstrap power supply circuit generates a constant voltage $V_{CCBST}$ for charging a bootstrap capacitor. An output transistor is configured as an N-channel MOSFET arranged such that its drain is connected to an input line and such that its source is connected to an output line. A constant voltage circuit connected to the gate of the output transistor stabilizes the gate voltage $V_G$ to a constant value. A variable impedance circuit is arranged between the input line and the gate of the output transistor, in order to provide a variable impedance. An impedance controller controls the impedance of the variable impedance circuit according to the state of a step-down DC/DC converter.

12 Claims, 6 Drawing Sheets

STEP-DOWN DC/DC CONVERTER

CROSS-REFERENCE TO RELATED APPLICATIONS

This application is based upon and claims the benefit of priority from the prior Japanese Patent Application No. 2015-209956, filed Oct. 26, 2015, the entire contents of which are incorporated herein by reference.

BACKGROUND OF THE INVENTION

1. Field of the Invention

The present invention relates to a DC/DC converter.

2. Description of the Related Art

Various kinds of electronic devices employ a DC/DC converter that converts a DC voltage having a given voltage value into a DC voltage having a different voltage value. FIG. 1 is a circuit diagram showing a step-down (buck) DC/DC converter. A DC/DC converter 100R receives a DC input voltage $V_{IN}$ via an input terminal 102, and generates an output voltage $V_{OUT}$ having a reduced voltage value at an output terminal 104. The DC/DC converter 100R includes an output circuit 110R and a control circuit 200R. The output circuit 110R mainly includes a switching transistor M1, an inductor L1, a rectifier diode D1, and an output capacitor C1. The output capacitor C1 is connected to the output terminal 104. One end of the inductor L1 is connected to a switching (LX) terminal of the control circuit 200R. The other end of the inductor L1 is connected to the output terminal 104. The rectifier diode D1 is arranged such that its anode is grounded and its cathode is connected to the LX terminal.

The switching transistor M1 is built into the control circuit 200R. A VCC terminal of the control circuit 200R is connected to the input terminal 102. The DC input voltage $V_{IN}$ is supplied to the VCC terminal. The switching transistor M1 is configured as an N-channel MOSFET, which is arranged such that its source is connected to the LX terminal and its drain is connected to the VCC terminal.

A detection terminal (VS) receives, as a feedback signal, a signal that indicates the state (current state, voltage state, electric power state, or the like) of the DC/DC converter 100R or otherwise the state of a load (not shown) connected to the output terminal 104. A pulse generator 202 generates a pulse signal S1 having a factor such as a duty ratio, frequency, or otherwise a combination thereof that is changed such that the state of the DC/DC converter 100R or otherwise the state of the load approaches a target state. For example, in a case in which the DC/DC converter 100R is configured as a constant voltage output DC/DC converter, the pulse generator 202 generates the pulse signal S1 such that the output voltage $V_{OUT}$ approaches a target voltage $V_{REF}$. In a case in which the DC/DC converter 100R is configured as a constant current output DC/DC converter, the pulse generator 202 generates the pulse signal S1 such that a current $I_{OUT}$ that flows through the load approaches a target value $I_{REF}$.

A driver 204 switches on and off the switching transistor M1 according to the pulse signal S1. In a case in which the switching transistor M1 is configured as an N-channel MOSFET as described above, in order to turn on the switching transistor M1, there is a need to apply a voltage to the gate of the switching transistor M1 that is higher than the voltage between its drain and source (i.e., input voltage $V_{IN}$). In order to supply such a voltage, a bootstrap circuit 210 is arranged. The bootstrap circuit 210 includes a bootstrap capacitor C2, a rectifier element 212, a transistor 214, and a bootstrap power supply circuit 220. The bootstrap capacitor C2 is arranged in the form of an external component between the LX terminal and a bootstrap (BST) terminal. The bootstrap power supply circuit 220 generates a constant voltage $V_{CCBST}$. The rectifier element 212 is arranged between the BST terminal and an output of the bootstrap power supply circuit 220. The transistor 214 is arranged between the LX terminal and the ground. The voltage $V_{BST}$ at the BST terminal is supplied to the upper-side power supply terminal of the driver 204.

During a period in which the switching transistor M1 is turned off, the transistor 214 is turned on, which grounds one end (LX-side end) of the bootstrap capacitor C2. In this state, the voltage $V_{CCBST}$ is applied to the other end (BST-side end) of the bootstrap capacitor C2 via the rectifier element 212. Accordingly, the bootstrap capacitor C2 is charged using the voltage across both ends thereof represented by ($V_{CCBST}-V_F$). Here, $V_F$ represents the forward voltage of the rectifier element 212. Such an arrangement is designed such that the relation $V_{CCBST}-V_F>V_{GS(TH)}$ holds true. Here, $V_{GS(TH)}$ represents a gate-source threshold voltage of the switching transistor M1.

In the turned-on period of the switching transistor M1, with the source voltage of the switching transistor M1 as $V_{LX}$, the voltage $V_{BST}$ at the BST terminal is represented by $V_{BST}=V_{LX}+(V_{CCBST}-V_F)$. The driver 204 uses the voltage $V_{BST}$ as a high-level voltage to be applied to the gate of the switching transistor M1. In this period, the gate-source voltage $V_{GS}$ is represented by $V_{GS}=V_{BST}-V_{LX}=(V_{CCBST}-V_F)$. That is to say, the relation $V_{GS}>V_{GS(TH)}$ holds true. Thus, the switching transistor M1 is turned on.

FIG. 2 is a circuit diagram showing a bootstrap power supply circuit 220R investigated by the present inventors. The bootstrap power supply circuit 220R is configured as a linear regulator (LDO: Low Drop Output) including resistors R21 and R22, an error amplifier 222, and a transistor 224. The transistor 224 is configured as a P-channel MOSFET. It is difficult for such an arrangement to provide high responsivity in the feedback operation. This leads to poor stability of the output voltage $V_{CCBST}$ generated by the bootstrap power supply circuit 220R. In order to solve such a problem, a smoothing capacitor C3 is connected to the output terminal of the bootstrap power supply circuit 220R, which improves the stability of the output voltage $V_{CCBST}$. Such an arrangement requires a $V_{CCBST}$ terminal (pad) as an additional terminal on the control circuit 200R. Furthermore, such an arrangement requires such a capacitor C3 in the form of an external component. This leads to a disadvantage from the viewpoint of the circuit area and cost.

SUMMARY OF THE INVENTION

FIG. 3 is a circuit diagram showing a control circuit 200S including a bootstrap power supply circuit 220S having a different circuit configuration investigated by the present inventors. The bootstrap power supply circuit 220S is configured as a linear regulator (LDO: Low Drop Output) including resistors R21 and R22, an error amplifier 222, and a transistor 226. The transistor 226 is configured as an N-channel MOSFET. Such an arrangement has an advantage of providing high responsivity in the feedback operation in a simple manner. Thus, such an arrangement does not require such a capacitor C3. However, in order to stabilize the output voltage $V_{CCBST}$ of the bootstrap power supply circuit 220S to a target value, there is a need to set the gate voltage $V_G$ of the transistor 226 such that the condition $V_G>V_{CCBST}+V_{GS(TH)}$ holds true. That is to say, in a reduced voltage state in which the input voltage $V_{CC}$ falls, such an arrangement leads to difficulty in maintaining the voltage $V_{CCBST}$.

The present invention has been made in order to solve such a problem. Accordingly, it is an exemplary purpose of an embodiment of the present invention to provide a control circuit including a compact-size bootstrap power supply circuit that is able to operate even in such a reduced voltage state.

An embodiment of the present invention relates to a control circuit for a step-down DC/DC converter comprising an N-channel switching transistor The control circuit comprises: a pulse generator that generates a pulse signal for instructing the switching transistor to turn on and off such that a state of the DC/DC converter or otherwise a state of a load approaches a target value; a bootstrap power supply circuit that generates a constant voltage that charges a bootstrap capacitor; a rectifier element arranged between an output of the bootstrap power supply circuit and one end of the bootstrap capacitor; and a driver that receives, via an upper-side power supply terminal, a voltage at one end of the bootstrap capacitor, and that drives the switching transistor according to the pulse signal. The bootstrap power supply circuit comprises: an input line that receives a DC voltage; an output line at which the constant voltage is generated; an output transistor configured as an N-channel MOSFET (Metal Oxide Semiconductor Field Effect Transistor), and arranged such that a drain thereof is connected to the input line and such that a source thereof is connected to the output line; a constant voltage circuit connected to a gate of the output transistor in order to stabilize a voltage at the gate; a variable impedance circuit arranged between the input line and the gate of the output transistor, and having an impedance that can be changed; and an impedance controller that controls the impedance of the variable impedance circuit according to a state of the step-down DC/DC converter.

With such an embodiment, by changing the impedance of the variable impedance circuit according to a situation of the DC/DC converter, such an arrangement is capable of controlling the current supply capacity for supplying the current to the gate of the output transistor. In a situation in which the charging voltage to be applied to the gate of the bootstrap capacitor could become insufficient, such an arrangement lowers the impedance in order to raise the driving capacity of the output transistor, thereby allowing the constant voltage to be maintained. In an opposite situation, such an arrangement raises the impedance, thereby suppressing the current consumption of the bootstrap power supply circuit.

Also, the impedance controller may lower the impedance according to a reduction in a voltage at the input line.

Also, the impedance controller may comprise a comparator that compares the voltage at the input line with a threshold voltage. Also, the impedance controller may switch the impedance according to an output of the comparator.

Also, the variable impedance circuit may lower its impedance according to a reduction in a voltage across the bootstrap capacitor.

Also, the variable impedance circuit may comprise: a current source that supplies a constant current to the gate of the output transistor; and an impedance circuit that is arranged in parallel with the current source, and that is switchable between an on state and an off state.

Also, the impedance controller may comprise a comparator that compares a voltage across the bootstrap capacitor with a threshold voltage. Also, the impedance controller may switch the impedance according to an output of the comparator.

Also, the variable impedance circuit may comprise: a first impedance element arranged between the input line and the gate of the output transistor; and a second impedance circuit that is arranged in parallel with the first impedance element, and that is switchable between an on state and an off state.

Also, the constant voltage circuit may comprise a Zener diode arranged such that a cathode thereof is connected to the gate of the output transistor.

Also, the constant voltage circuit may comprise a regulator that stabilizes a voltage at the gate of the output transistor.

Also, the control circuit according to an embodiment may be monolithically integrated on a single semiconductor substrate. Examples of such a "monolithically integrated" arrangement include: an arrangement in which all the circuit components are formed on a semiconductor substrate; and an arrangement in which principal circuit components are monolithically integrated. Also, a part of the circuit components such as resistors and capacitors may be arranged in the form of components external to such a semiconductor substrate in order to adjust the circuit constants.

Another embodiment of the present invention relates to a step-down DC/DC converter. The step-down DC/DC converter comprises any one of the aforementioned control circuits.

Yet another embodiment of the present invention relates to an in-vehicle power supply apparatus. The in-vehicle power supply apparatus comprises the aforementioned step-down DC/DC converter.

It is to be noted that any arbitrary combination or rearrangement of the above-described structural components and so forth is effective as and encompassed by the present embodiments. Moreover, this summary of the invention does not necessarily describe all necessary features so that the invention may also be a sub-combination of these described features.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described based on preferred embodiments which do not intend to limit the scope of the present invention but exemplify the invention. All of the features and the combinations thereof described in the embodiment are not necessarily essential to the invention.

In the present specification, the state represented by the phrase "the member A is connected to the member B" includes a state in which the member A is indirectly connected to the member B via another member that does not affect the electric connection therebetween, in addition to a state in which the member A is physically and directly connected to the member B.

Similarly, the state represented by the phrase "the member C is provided between the member A and the member B" includes a state in which the member A is indirectly connected to the member C, or the member B is indirectly connected to the member C via another member that does not affect the electric connection therebetween, in addition to a state in which the member A is directly connected to the member C, or the member B is directly connected to the member C.

Also, the phrase "a signal A (voltage or current) corresponds to a signal B (voltage or current)" means the state in which the signal A has a correlation with the signal B. Specific examples of such a state include: (i) a state in which the signal A is the same as the signal B; (ii) a state in which the signal A is proportional to the signal B; (iii) a state in which the signal A is obtained by shifting the level of the signal B; (iv) a state in which the signal A is obtained by amplifying the signal B; (v) a state in which the signal A is obtained by inverting the signal B; (vi) a desired combination of the aforementioned states (i) through (v); and the like. The range of "corresponds" as described above is determined by the kinds of the signals A and B and the usage of the signals A and B, which can clearly be understood by those skilled in this art.

Figure 4:
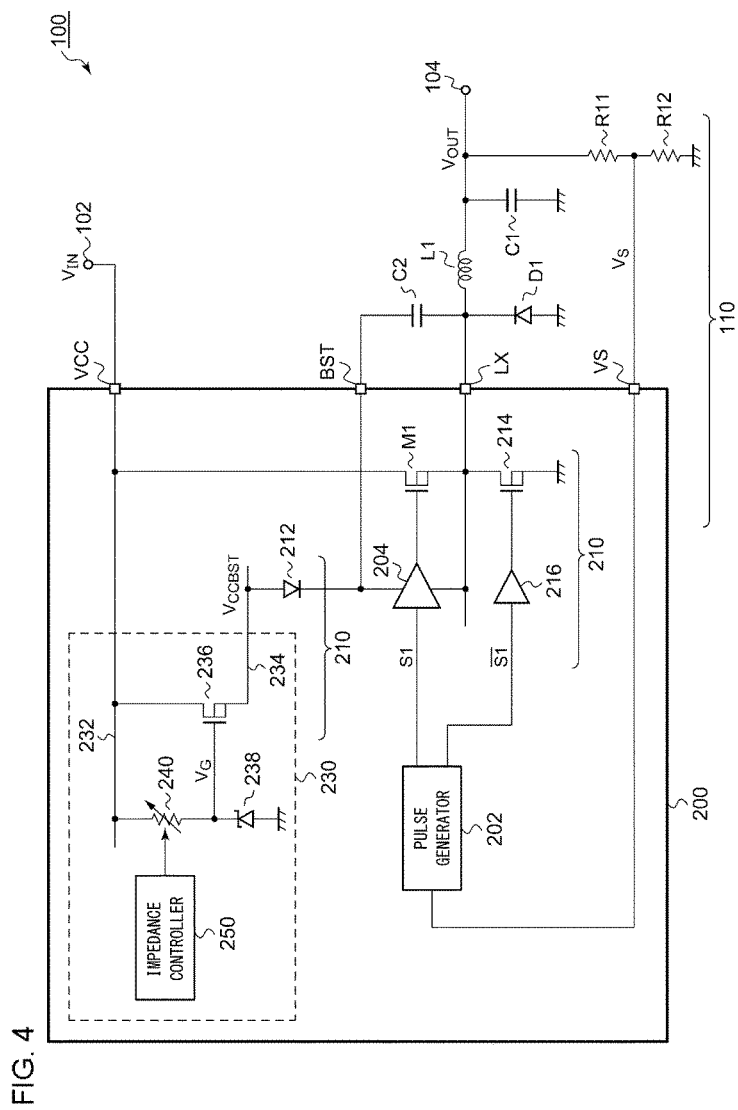
FIG. 4 is a DC/DC converter according to an embodiment.

FIG. 4 is a circuit diagram showing a DC/DC converter 100 according to an embodiment. The DC/DC converter 100 is configured as a step-down DC/DC converter as with an arrangement shown in FIG. 1. The DC/DC converter 100 receives a DC input voltage $V_{IN}$ via an input terminal 102, and generates an output voltage $V_{OUT}$ having a lowered voltage value via an output terminal 104. The DC/DC converter 100 includes an output circuit 110 and a control circuit 200. Description will be made in the present embodiment as an example regarding a DC/DC converter that outputs a constant voltage.

Figure 1:
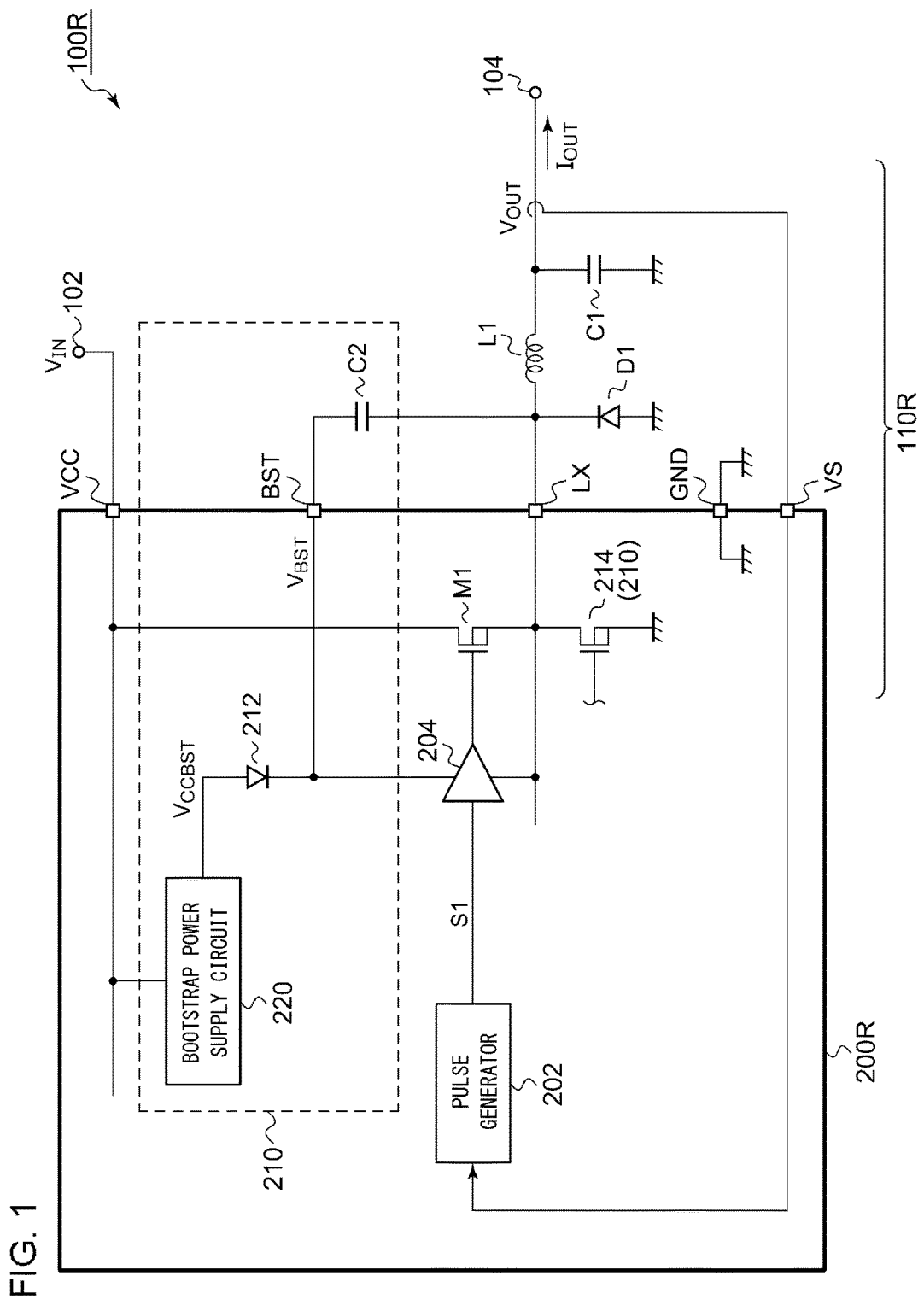
FIG. 1 is a circuit diagram showing a step-down DC/DC converter.

The output circuit 110 includes resistors R11 and R12 in addition to the components of the output circuit 110R shown in FIG. 1. The resistors R11 and R12 are used to divide the output voltage $V_{OUT}$ to be controlled, so as to generate a detection voltage $V_S$. The detection voltage $V_S$ thus obtained is supplied to a voltage detection (VS) terminal of the control circuit 200. The resistors R11 and R12 may be built into the control circuit 200.

The control circuit 200 includes a pulse generator (which is also referred to as the "pulse modulator") 202, a driver 204, and a bootstrap circuit 210 in addition to the switching transistor M1. The control circuit 200 is configured as a function IC (Integrated Circuit) monolithically integrated on a single semiconductor substrate. The switching transistor M1 is arranged such that its drain is connected to a $V_{IN}$ terminal and such that its source is connected to an LX terminal.

The pulse generator 202 generates a pulse signal S1 having a factor such as a duty ratio, frequency, or a combination thereof that is changed such that the state of the DC/DC converter 100 or otherwise the state of a load (not shown) connected to the output terminal 104 approaches a target state. With the constant voltage output DC/DC converter 100 according to the present embodiment, the pulse generator 202 generates the pulse signal S1 such that the detection voltage $V_S$ that corresponds to the output voltage $V_{OUT}$ approaches a target voltage $V_{REF}$. It should be noted that, in a case in which the DC/DC converter 100 is configured as a constant current output DC/DC converter, the pulse generator 202 generates the pulse signal S1 such that the current $I_{OUT}$ that flows through the load approaches a target value $I_{REF}$.

The pulse generator 202 may be configured using known techniques. The control method and the configuration thereof are not restricted in particular. Various kinds of control methods may be employed, examples of which include a voltage mode method, a peak current mode method, an average current mode method, a hysteresis control (Band-Band) method, a bottom detection constant on-time (COT: Constant On Time) method, and the like. Examples of the modulation method that can be employed for modulating the pulse signal S1 include a pulse width modulation method, a pulse frequency modulation method, and the like. The pulse modulator 202 may be configured as an analog circuit employing an error amplifier and a comparator, a processor that performs digital calculation, or otherwise a combination of such an analog circuit and a digital circuit. Also, the pulse generator 202 may switch the control method according to the state of the load.

The driver 204 switches on and off the switching transistor M1 according to the pulse signal S1. In a case in which the switching transistor M1 is configured as an N-channel MOSFET as described above, in order to turn on the switching transistor M1, there is a need to apply a voltage to the gate of the switching transistor M1 that is higher than its drain-source voltage (i.e., the input voltage $V_{IN}$). In order to meet such a requirement, the bootstrap circuit 210 is provided. The bootstrap circuit 210 includes a bootstrap capacitor C2, a rectifier element 212, a transistor 214, and a bootstrap power supply circuit 230. The bootstrap capacitor C2 is arranged as an external component between the LX terminal and the bootstrap (BST) terminal. The bootstrap power supply circuit 230 generates a constant voltage $V_{CCBST}$. The rectifier element 212 is arranged between the BST terminal and the output of the bootstrap power supply circuit 230. The transistor 214 is arranged between the LX terminal and the ground. The driver 204 is arranged such that the voltage $V_{BST}$ at the BST terminal is supplied to its upper-side power supply terminal, and such that its lower-side power supply terminal is connected to the LX terminal. During the charging period for the bootstrap capacitor C2, the transistor 214 is turned on.

In the off period of the switching transistor M1, the transistor 214 is turned on, which connects one end (LX-side end) of the bootstrap capacitor C2 to the ground. In this state, the voltage $V_{CCBST}$ is applied to the other end (BST-side end) of the bootstrap capacitor C2 via the rectifier element 212, thereby charging the bootstrap capacitor C2 using the voltage represented by $(V_{CCBST} - V_F)$ applied to both ends thereof. Here, $V_F$ represents the forward voltage of the rectifier element 212. Such an arrangement is designed such that the relation $V_{CCBST} - V_F > V_{GS(TH)}$ holds true. Here, $V_{GS(TH)}$ represents the gate-source threshold voltage of the switching transistor M1. The rectifier element 212 may be configured as a switch that switches its state between the on state and the off state in synchronization with the switching transistor M1.

With the source voltage of the switching transistor M1 as $V_{LX}$, in the turned-on period of the switching transistor M1, the voltage $V_{BST}$ at the BST terminal is represented by $V_{BST}=V_{LX}+(V_{CCBST}-V_F)$. The driver 204 uses the voltage $V_{BST}$ as a high-level voltage, which is applied to the gate of the switching transistor M1. In this state, the gate-source voltage $V_{GS}$ of the switching transistor M1 is represented by $V_{GS}=V_{BST}-V_{LX}=(V_{CCBST}-V_F)$. With such an arrangement, the relation $V_{GS}>V_{GS(TH)}$ holds true. Accordingly, the switching transistor M1 is turned on.

The bootstrap power supply circuit 230 includes an input line 232, an output line 234, an output transistor 236, a constant voltage circuit 238, a variable impedance circuit 240, and an impedance controller 250.

The input line 232 is connected to the VCC terminal so as to receive the DC voltage $V_{CC}$ (input voltage $V_{IN}$). The bootstrap power supply circuit 230 generates the constant voltage $V_{CCBST}$ at the output line 234. The output transistor 236 is configured to as an N-channel MOSFET (Metal Oxide Semiconductor Field Effect Transistor) arranged such that its drain is connected to the input line 232 and such that its source is connected to the output line 234. The constant voltage circuit 238 is connected to the gate of the output transistor 236, which stabilizes the voltage $V_G$ at the gate to a constant value. The constant voltage circuit 238 may include a Zener diode (constant voltage diode) arranged such that its cathode is connected to the gate of the output transistor 236 and such that its anode is grounded.

The variable impedance circuit 240 is arranged between the input line 232 and the gate of the output transistor 236. The variable impedance circuit 240 is provided in order to supply an operation current to the constant voltage circuit 238. The variable impedance circuit 240 has at least two switchable impedance setting values. Also, the variable impedance circuit 240 may be configured to have a variable impedance that can be continuously changed. The impedance controller 250 switches or otherwise changes the impedance of the variable impedance circuit 240 according to the state of the DC/DC converter 100.

The above is the configuration of the DC/DC converter 100. Next, description will be made regarding the operation thereof. By adjusting the impedance of the variable impedance circuit 240 according to a situation of the DC/DC converter 100, such an arrangement is capable of controlling the current supply capacity for supplying a current to the gate of the output transistor 236. For example, in a situation in which the charging voltage (i.e., constant voltage $V_{CCBST}$) to be supplied to the bootstrap capacitor C2 could become insufficient, the impedance is reduced so as to raise the driving capacity of the output transistor 236, thereby allowing the constant voltage $V_{CCBST}$ to be maintained. In an opposite situation, the impedance is raised so as to suppress the current consumption of the constant voltage circuit 238.

Detailed description will be made regarding the advantages of the bootstrap power supply circuit 230. In a case in which the bootstrap power supply circuit 230 is designed giving consideration only to a problem that occurs in the reduced voltage state, the variable impedance circuit 240 may preferably be replaced by a fixed impedance circuit having a fixed and sufficiently low impedance, thereby providing a simple circuit configuration having a sufficient current capacity. However, with such an arrangement, in a normal voltage state or an overvoltage state, an unnecessarily large current flows through the constant voltage circuit 238, leading to a problem of increased power consumption. In contrast, with the bootstrap power supply circuit 230, the variable impedance circuit 240 is provided having an impedance that is raised according to its situation. Such an arrangement has an advantage of securing operation stability even in the reduced voltage state, and an advantage of suppressing an increase in the power consumption of the constant voltage circuit 238.

Figure 2:
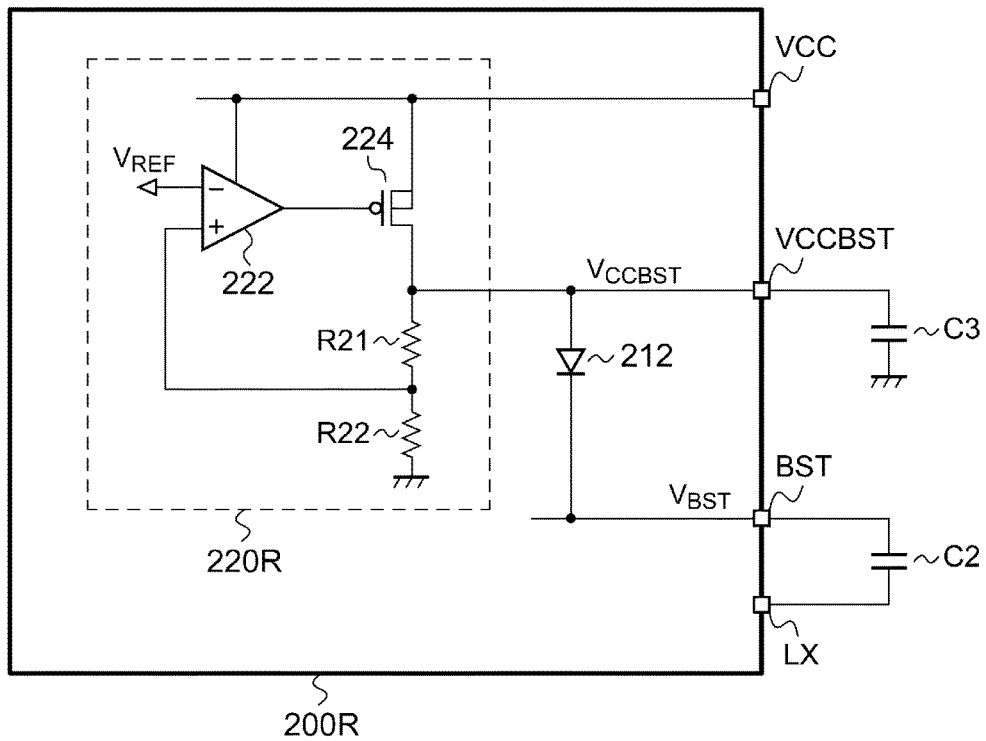
FIG. 2 is a circuit diagram showing a bootstrap power supply circuit investigated by the present inventors.
Figure 3:
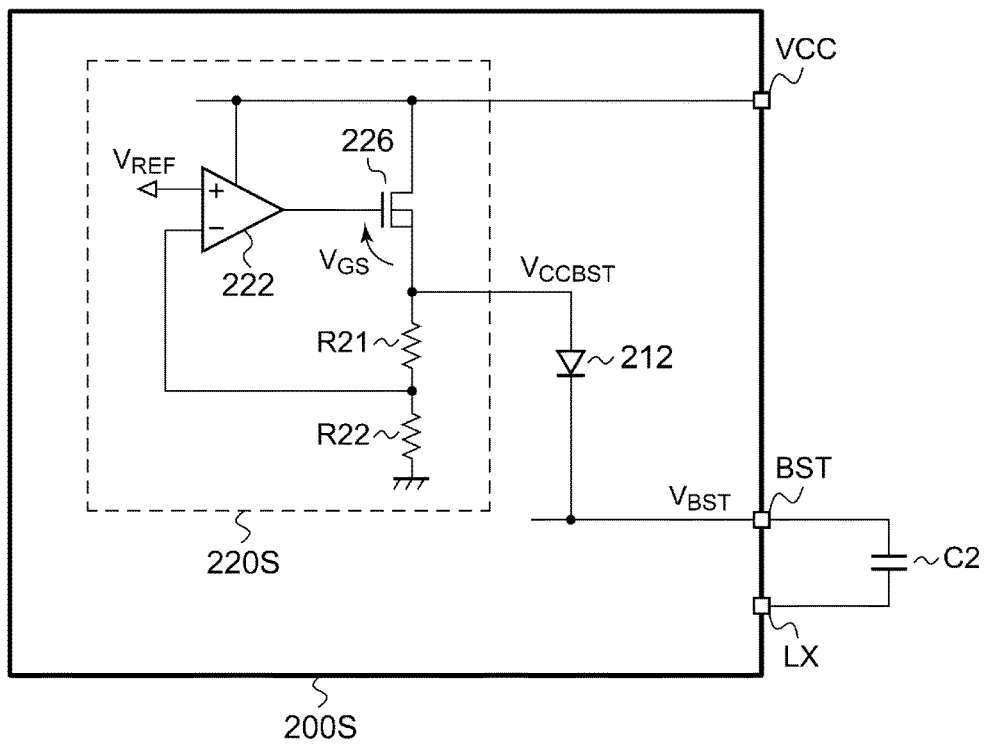
FIG. 3 is a circuit diagram showing another bootstrap power supply circuit investigated by the present inventors.

Furthermore, the bootstrap power supply circuit 230 does not require the $V_{CCBST}$ terminal and the capacitor C3 in the form of an external component, unlike the bootstrap power supply circuit 220R shown in FIG. 2. This allows the bootstrap power supply circuit 230 to have a compact circuit area, thereby providing an advantage of a low cost. In addition, the bootstrap power supply circuit 230 provides superior performance in the reduced voltage state as compared with the bootstrap power supply circuit 220S shown in FIG. 3.

The present invention encompasses various kinds of apparatuses and circuits that can be regarded as a block configuration or a circuit configuration shown in FIG. 4, or otherwise that can be derived from the aforementioned description. That is to say, the present invention is not restricted to a specific circuit configuration. More specific description will be made below regarding an example configuration for clarification and ease of understanding of the essence of the present invention and the circuit operation. That is to say, the following description will by no means be intended to restrict the technical scope of the present invention.

Figure 5:
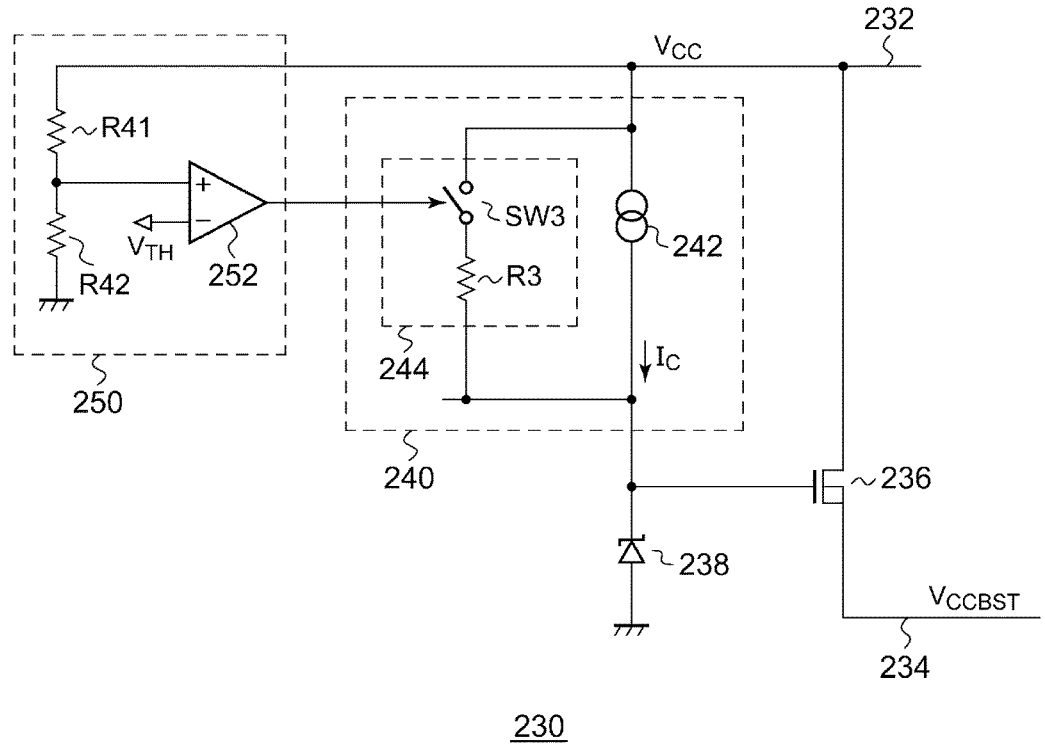
FIG. 5 is a circuit diagram showing an example configuration of a bootstrap power supply circuit.

FIG. 5 is a circuit diagram showing an example configuration of the bootstrap power supply circuit 230. The variable impedance circuit 240 includes a current source 242 and an impedance circuit 244. The current source 242 supplies a constant current $I_C$ to the gate of the output transistor 236 (and the constant voltage circuit 238). The impedance circuit 244 is arranged in parallel with the current source 242, and configured such that its state is switchable between the on state and the off state. In the on state, the impedance circuit 244 is designed to provide an impedance that is lower than that of the current source 242. For example, in the on state, the impedance circuit 244 may be designed to provide an impedance on the order of several dozen kΩ to several hundred kΩ, e.g., to provide an impedance of 10 kΩ. The impedance circuit 244 may include a switch SW3 and a resistor R3 connected in series. It should be noted that, in a case in which the switch SW3 is configured as a transistor having a small size that involves a sufficiently large on resistance, the on resistance of such a transistor may be used as the resistor R3.

When the switch SW3 is turned off, the variable impedance circuit 240 provides an impedance that is equal to the impedance of the current source 242, i.e., provides a very high impedance. When the switch SW3 is turned on, the impedance of the impedance circuit 244 becomes dominant as the overall impedance of the variable impedance circuit 240, i.e., provides a low impedance.

The impedance controller 250 lowers the impedance of the variable impedance circuit 240 according to a reduction in the voltage $V_{CC}$ input via the input line 232. Specifically, when the DC voltage $V_{IN}$ having a normal level or otherwise a level that is higher than the normal level is supplied to the DC/DC converter 100, the impedance controller 250 turns off the switch SW3 of the variable impedance circuit 240 so as to provide an impedance set to a high value. When the input voltage $V_{IN}$ falls, i.e., when the reduced voltage state occurs, the impedance controller 250 turns on the switch SW3 of the variable impedance circuit 240 so as to provide an impedance set to a low value.

For example, the impedance controller 250 includes a comparator 252 and resistors R41 and R42. The resistors R41 and R42 divide the voltage $V_{CC}$ at the input line 232.

The comparator 252 compares the divided voltage $V_{CC}'$ with a threshold voltage $V_{TH}$. The switch SW3 is controlled according to the output of the comparator 252. Specifically, when $V_{CC}'>V_{TH}$, i.e., in the normal voltage state or otherwise in the overvoltage state, the switch SW3 is turned off. When $V_{CC}'<V_{TH}$, i.e., in the reduced voltage state, the switch SW3 is turned on.

Figure 6:
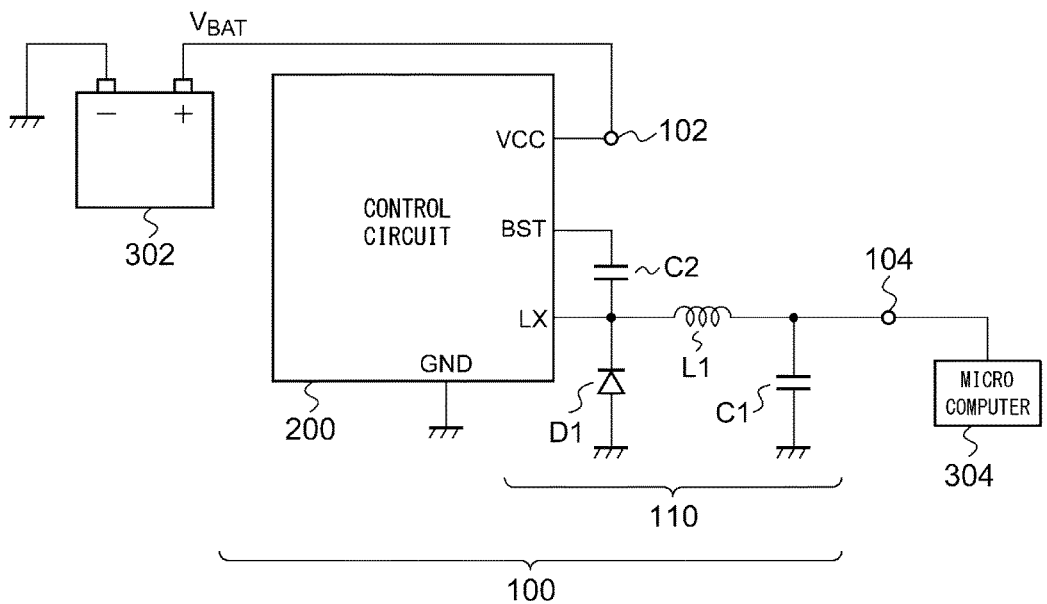
FIG. 6 is a circuit diagram showing an in-vehicle power supply apparatus.

Lastly, description will be made regarding a preferable usage of the DC/DC converter 100. FIG. 6 is a circuit diagram showing an in-vehicle power supply apparatus 300. The in-vehicle power supply apparatus 300 includes a battery 302 and a DC/DC converter 100. The battery 302 generates a DC voltage (battery voltage) $V_{BAT}$ of 12 V or otherwise 24 V. It should be noted that, with the battery voltage $V_{BAT}$, a constant rated voltage value cannot be obtained over time. Rather, the battery voltage $V_{BAT}$ varies in a wide range. The DC/DC converter 100 receives the battery voltage $V_{BAT}$ as the input voltage $V_{IN}$, steps down the input voltage $V_{IN}$ thus received, and supplies the voltage thus stepped down to a load such as a microcomputer 304 or the like. With the in-vehicle power supply apparatus 300, a reduced voltage state, which is the so-called "cold crank state", can potentially occur. The DC/DC converter 100 is required to operate normally even in such a cold crank state. As described above, the bootstrap power supply circuit 230 has an advantage of being able to operate normally over a wide voltage range from such an reduced voltage state to an overvoltage state. From this viewpoint, the DC/DC converter 100 according to the embodiment is preferably applicable to the in-vehicle power supply apparatus 300.

Description has been made above regarding the present invention with reference to the embodiment. The above-described embodiment has been described for exemplary purposes only, and is by no means intended to be interpreted restrictively. Rather, it can be readily conceived by those skilled in this art that various modifications may be made by making various combinations of the aforementioned components or processes, which are also encompassed in the technical scope of the present invention. Description will be made below regarding such modifications.

[First Modification]

Figure 7A:
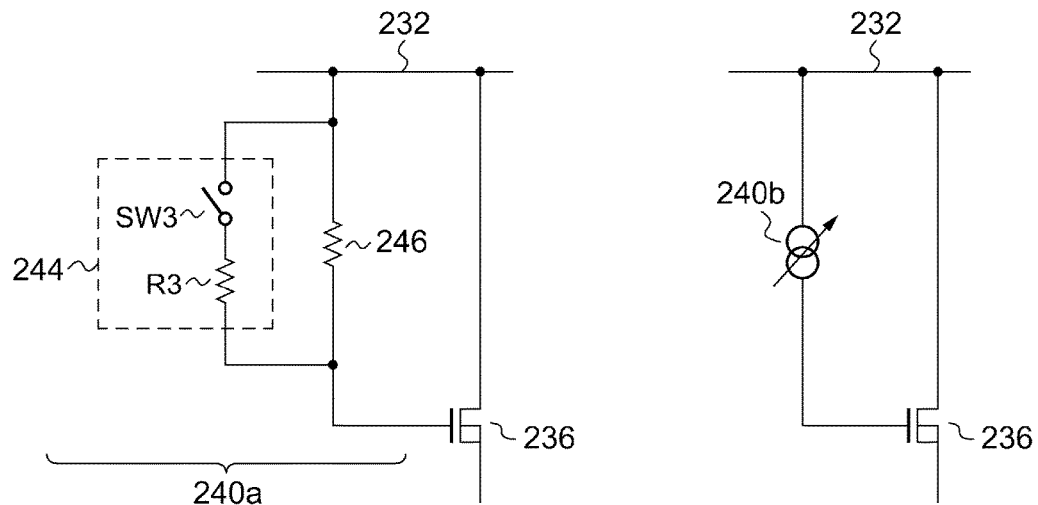
FIGS. 7A and 7B are circuit diagrams each showing a variable impedance circuit according to a first modification.
Figure 7B:
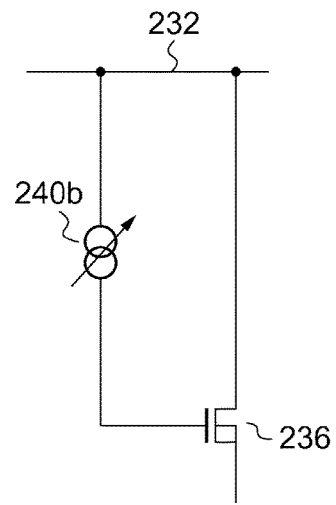

FIGS. 7A and 7B are circuit diagrams each showing a variable impedance circuit according to a first modification. A variable impedance circuit 240a shown in FIG. 7A includes an impedance element 246 instead of the current source 242 shown in FIG. 5. The impedance element 246 has a sufficiently high fixed impedance. Also, a variable impedance circuit 240b as shown in FIG. 7B may be configured as a variable current source. In addition, various kinds of modifications may be made for the variable impedance circuit 240, which are encompassed within the technical scope of the present invention.

[Second Modification]

Figure 8:
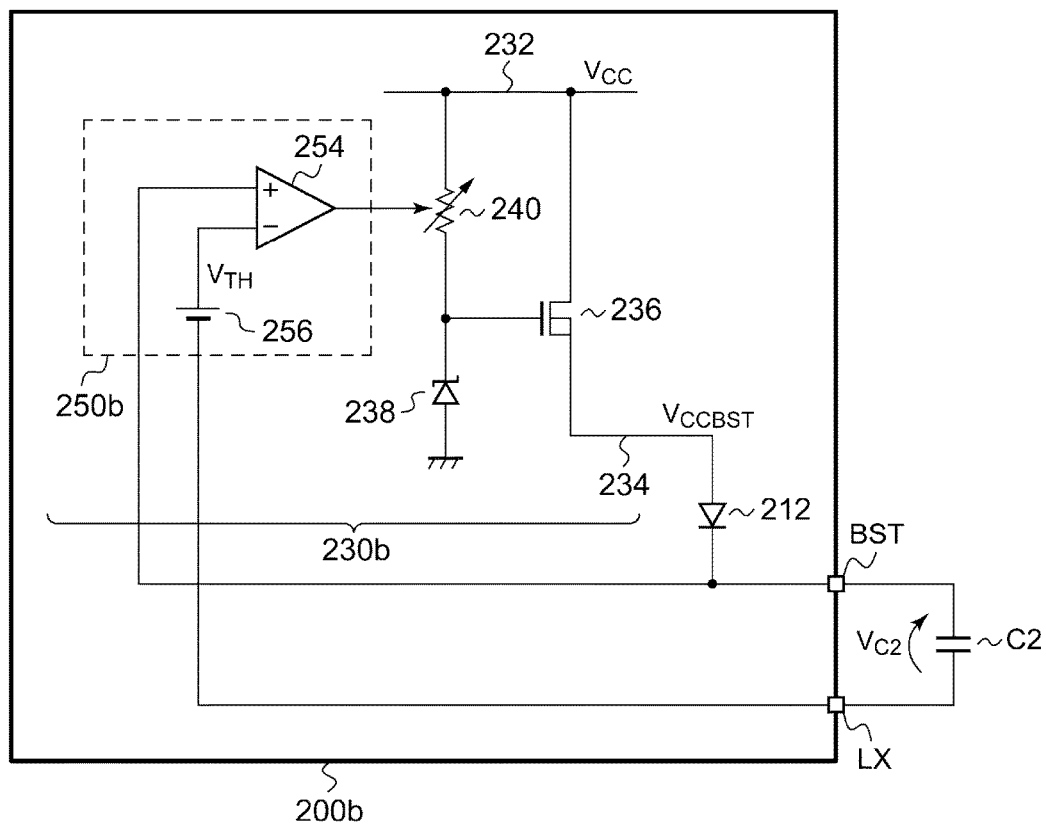
FIG. 8 is a circuit diagram showing a bootstrap power supply circuit according to a second modification.

The impedance controller 250 may control the impedance of the variable impedance circuit 240 based on the voltage $V_{C2}$ across both ends of the bootstrap capacitor C2. FIG. 8 is a circuit diagram showing a control circuit 200b including a bootstrap power supply circuit 230b according to a second modification. An impedance controller 250b lowers the impedance of the variable impedance circuit 240 according to a reduction in the voltage $V_{C2}$ across the bootstrap capacitor C2.

The impedance controller 250b includes a comparator 254 and a voltage source 256. The comparator 254 compares the voltage $V_{C2}$ across the bootstrap capacitor C2 with the threshold voltage $V_{TH}$. The impedance of the variable impedance circuit 240 is switched according to the output of the comparator 254. That is to say, when $V_{C2}>V_{TH}$, the impedance of the variable impedance circuit 240 is set to a high value. Conversely, when $V_{C2}<V_{TH}$, the impedance of the variable impedance circuit 240 is set to a low value. With such a modification, whether or not a reduced voltage state has occurred is detected based on the voltage $V_{C2}$ across the bootstrap capacitor C2. Such an arrangement is capable of appropriately controlling the impedance of the variable impedance circuit 240.

[Third Modification]

Figure 9:
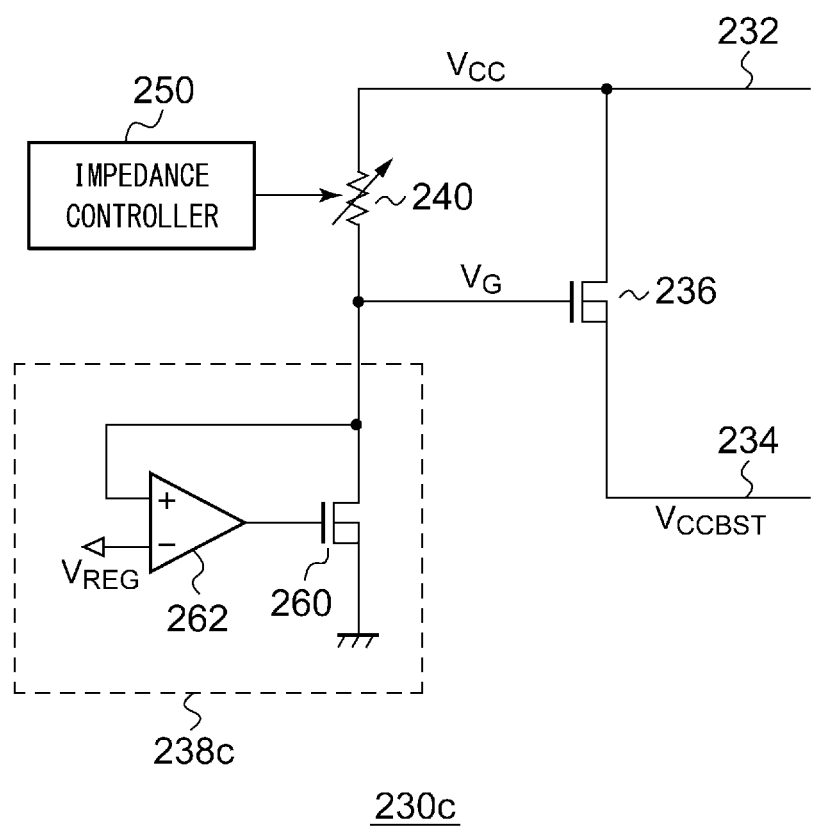
FIG. 9 is a circuit diagram showing a bootstrap power supply circuit according to a third modification.

The constant voltage circuit 238 is not restricted to such a Zener diode. Also, other kinds of circuit configurations may be employed. FIG. 9 is a circuit diagram showing a bootstrap power supply circuit 230c according to a third modification. The constant voltage circuit 238c can be regarded as one kind of shunt regulator including a transistor 260 and an error amplifier 262. The transistor 260 is arranged such that its one terminal (source) is grounded and such that its drain is connected to the gate of the output transistor 236. The error amplifier 262 is arranged such that its inverting input terminal receives a reference voltage $V_{REG}$ and such that its non-inverting input terminal receives the gate voltage $V_G$ of the output transistor 236 as a feedback signal. Such an arrangement allows the gate voltage $V_G$ of the output transistor 236 to be stabilized to the reference voltage $V_{REG}$.

Also, the constant voltage circuit 238 may be configured as a constant voltage clamp circuit. Also, the constant voltage circuit 238 may include multiple diodes arranged in series.

[Fourth Modification]

Description has been made in the embodiment regarding a diode rectification DC/DC converter. Also, the present invention is applicable to a synchronous rectification DC/DC converter. Such a modification may be made based on the circuit configuration shown in FIG. 4. That is to say, the rectifier diode D1 may be removed, and in order to allow the transistor 214 to function as a synchronous rectification transistor, the transistor 214 may be configured to have a sufficiently large size so as to supply a coil current that flows through the inductor L1.

[Fifth Modification]

Also, the impedance controller 250 may control the impedance of the variable impedance circuit 240 based on information that differs from the DC voltage $V_{CC}$ or the voltage $V_{C2}$ across the bootstrap capacitor C2. For example, the impedance controller 250 may control the impedance based on the gate voltage of the output transistor 236. Also, the impedance controller 250 may control the impedance based on a desired combination of the DC voltage $V_{CC}$, the voltage $V_{C2}$ across the bootstrap capacitor C2, the gate voltage $V_G$, and the like.

Also, the impedance controller 250 may switch the impedance of the variable impedance circuit 240 between three or more values based on at least one from among the DC voltage $V_{CC}$, the voltage $V_{C2}$ across the bootstrap capacitor C2, and the gate voltage $V_G$. Also, the impedance controller 250 may adjust the impedance in a continuous manner.

While the preferred embodiments of the present invention have been described using specific terms, such description is for illustrative purposes only, and it is to be understood that changes and variations may be made without departing from the spirit or scope of the appended claims.

What is claimed is:

1. A control circuit for a step-down DC/DC converter comprising an N-channel switching transistor, the control circuit comprising:
    a pulse generator structured to generate a pulse signal for instructing the switching transistor to turn on and off such that a state of the step-down DC/DC converter or otherwise a state of a load approaches a target value;
    a bootstrap power supply circuit structured to generate a constant voltage for charging a bootstrap capacitor;
    a rectifier element arranged between an output of the bootstrap power supply circuit and one end of the bootstrap capacitor; and
    a driver having its upper-side power supply terminal coupled to receive a voltage at the one end of the bootstrap capacitor, and structured to drive the switching transistor according to the pulse signal,
    wherein the bootstrap power supply circuit comprises:
        an input line which is to be coupled to receive a DC voltage;
        an output line at which the constant voltage is generated;
        an output transistor configured as an N-channel MOSFET (Metal Oxide Semiconductor Field Effect Transistor), having a drain connected to the input line and a source connected to the output line;
        a constant voltage circuit coupled to a gate of the output transistor and structured to stabilize a voltage at the gate of the output transistor;
        a variable impedance circuit arranged between the input line and the gate of the output transistor, and having an impedance that can be changed; and
        an impedance controller that controls the impedance of the variable impedance circuit according to a state of the step-down DC/DC converter.

2. The control circuit according to claim 1, wherein the impedance controller is structured to lower the impedance according to a reduction in a voltage at the input line.

3. The control circuit according to claim 1, wherein the impedance controller comprises a comparator structured to compare the voltage at the input line with a threshold voltage,
    wherein the impedance controller structured to switch the impedance according to an output of the comparator.

4. The control circuit according to claim 1, wherein the impedance controller is structured to lower the impedance according to a reduction in a voltage across the bootstrap capacitor.

5. The control circuit according to claim 1, wherein the impedance controller comprises a comparator structured to compare a voltage across the bootstrap capacitor with a threshold voltage,
    and wherein the impedance controller is structured to switch the impedance according to an output of the comparator.

6. The control circuit according to claim 1, wherein the variable impedance circuit comprises:
    a current source structured to supply a constant current to the gate of the output transistor; and
    an impedance circuit that is arranged in parallel with the current source, and that is switchable between an on state and an off state.

7. The control circuit according to claim 1, wherein the variable impedance circuit comprises:
    a first impedance element arranged between the input line and the gate of the output transistor; and
    a second impedance circuit that is arranged in parallel with the first impedance element, and that is switchable between an on state and an off state.

8. The control circuit according to claim 1, wherein the constant voltage circuit comprises a Zener diode having its cathode coupled to the gate of the output transistor.

9. The control circuit according to claim 1, wherein the constant voltage circuit comprises a regulator structured to stabilize a voltage at the gate of the output transistor.

10. The control circuit according to claim 1, monolithically integrated on a single semiconductor substrate.

11. A step-down DC/DC converter comprising the control circuit according to claim 1.

12. An in-vehicle power supply apparatus comprising the step-down DC/DC converter according to claim 11.

* * * * *